E. S. Hidden,
Side Lights for Ships.
No. 1,638. Reissued Mar. 15, 1864.
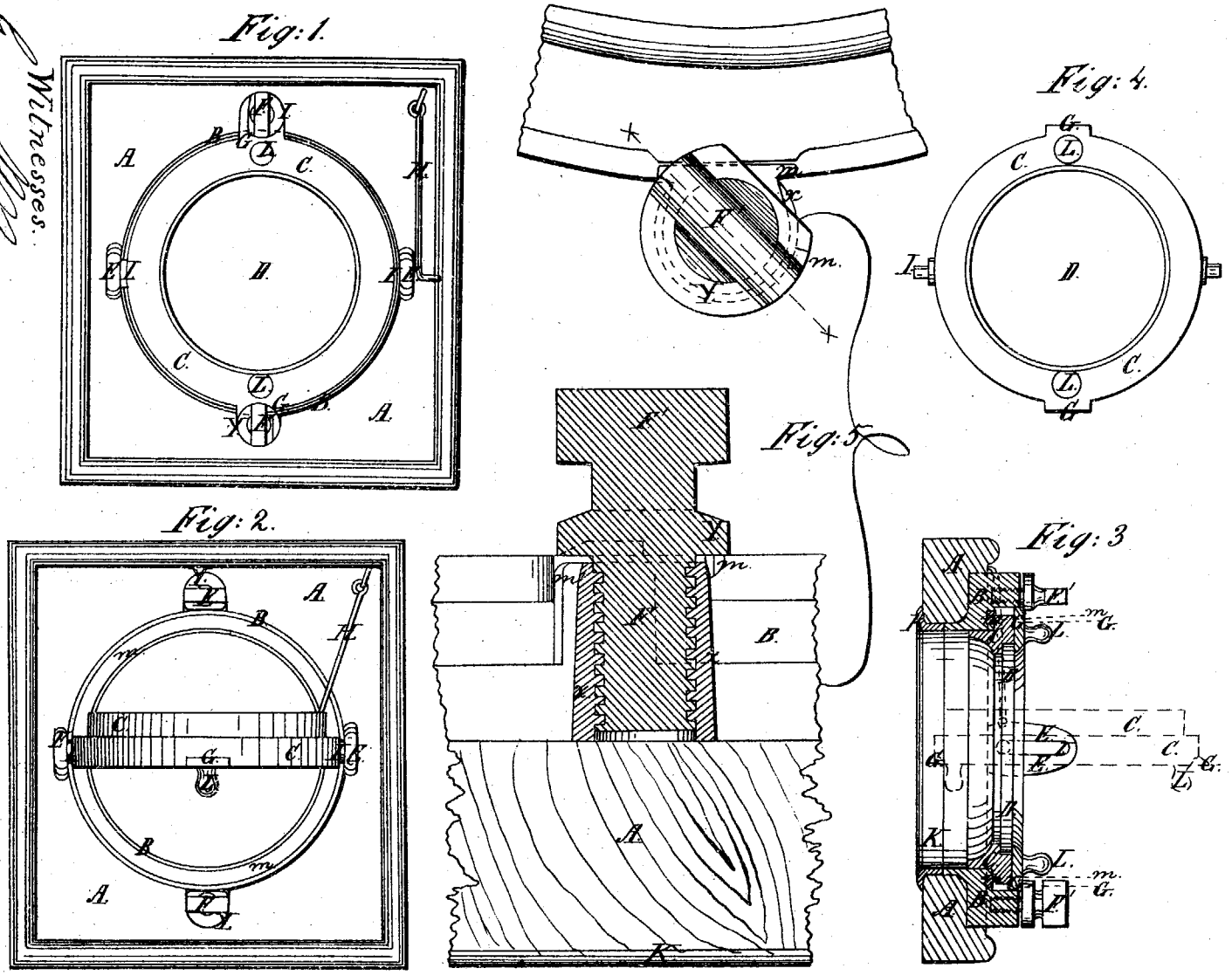
Witnesses.
George B. Burn
Jras Lockwood
Inventor.
Enoch Hidden.
N. PETERS, PHOTO-LITHOGRAPHER, WASHINGTON, D. C.

UNITED STATES PATENT OFFICE.

ENOCH S. HIDDEN, OF NEW YORK, N. Y., ASSIGNEE OF ENOCH HIDDEN.

IMPROVEMENT IN SIDE LIGHTS FOR SHIPS.

Specification forming part of Letters Patent No. 9,811, dated June 21, 1853; Reissue No. 1,533, dated September 8, 1863; Reissue No. 1,638, dated March 15, 1864.

*To all whom it may concern:*

Be it known that I, ENOCH HIDDEN, of the city, county, and State of New York, have invented certain new and useful improvements in ships' lights, the same being applicable to the decks as well as the sides of ships and other vessels; and I do hereby declare that the following, taken in connection with the drawings, is a full, clear, and exact description thereof.

In the drawings, Figure 1 is a front view of the light, taken from the inside of the vessel, with the frame containing the glass shut. Fig. 2 is a similar view with the glass frame open so as to attain ventilation. Fig. 3 is a section through the light in the same position as Fig. 1, and also showing the glass frame in elevation and open, and one of the lugs also in elevation. Fig. 4 is a front elevation of the glass frame alone, and Fig. 5 is a plan of and section through the releasing and confining apparatus, full size.

Ships' lights as used prior to the time of my invention consisted of five principal parts—viz., a frame or bed piece of metal attached to the side or the deck of the vessel, water tight, and with an opening through the same and the side or deck of the vessel; second, a rim or frame containing a piece of thick glass operating to shut the opening through the side of the vessel; third, a hinge or hinges on which the glass and its rim could turn; fourth, a packing interposed between the glass frame and the stationary frame; and fifth, a screw or screws for forcing the glass rim to compress the interposed packing, and holding it in that position so as to close the opening water tight, such screws also being capable of releasing their hold so that the glass frame might be opened in good weather, thereby affording ventilation.

My improvements relate, first, to the releasing and confining apparatus or contrivances; second, to the hinges for which I have contrived substitutes; and third, to the method of making a water-tight joint between the metallic frame attached to the side of the vessel and the side or deck.

In the drawings the side or deck of the vessel is represented at A A and the stationary metallic frame at B B. This frame is to be attached to the side by screws or otherwise firmly, and is made of some alloy of copper. To this frame is soldered or otherwise secured by a water-tight joint a ring or sleeve, K K, of some ductile metal—such as lead or pure or nearly pure copper—and when the frame is attached to the side or deck and the sleeve passed through the aperture in the side or deck, the sleeve is to be turned over or flanged, as clearly shown in Fig. 3, and to be hammered tight down against the outside of the vessel or packing interposed between the flange and the side or deck, thus making a water-tight joint, such method of making the joint by a ductile metal flange soldered to the frame being one feature of my invention. This frame carries a ring of india-rubber or other packing, clearly shown at M M, and from the frame project two lugs, E E, either made in one piece therewith or firmly secured thereto. These lugs have long mortises slotted in them, as clearly shown in Fig. 3, and in these mortises slide and turn pins J J, attached to and projecting from the glass frame C C, containing the glass D D, properly secured thereon in any usual or convenient manner. This glass frame is, for the sake of convenience, fitted with two projecting knobs, L L, and for the same reason with two projections, G G. When the glass frame is shut and forced down upon the packing by a releasing and confining apparatus, the pins will lie in those ends of the slots that are nearest the stationary frame. When a confining apparatus is so actuated as to permit the glass and its frame to be moved, a person taking hold of the knobs can draw the glass frame bodily inward, so that the pins I I travel to the ends of the slots farthest from the stationary frame, and can then turn the glass frame so that part of it will lie in the opening through the sleeve, in the position shown in elevation in Fig. 3, and it may be held in that position by a hook, H, attached to the stationary frame and hooking into an eye attached to the light-frame.

When it is desired to shut the glass frame, the hook is to be unhooked, the frame turned on the pins, and then the frame, with the pins, is to be slid backward bodily in the slots until the glass frame touches the packing. This plan of attaching the light frame to the stationary frame by means of pins and long mortises is also of my invention, and it is clear that it will always guide the light frame into place for being shut tight, and will be less liable to rust or jam fast than ordinary hinges.

In the stationary frame are chased or secured two screw-nuts, X X, and two screws, F F, enter these nuts. These screws have thumb-pieces, F′ F′, or some other contrivance by which they can be turned, and have also flanges Y Y affixed thereto or making part thereof. These flanges are shaped substantially as shown in the drawings, so that when in one position the flange will cover the glass frame, and when in another the flange will not project over the glass frame; and the side of each flange nearest this frame is inclined in such manner that when the flange is turned in one direction so as to project over the frame, the inclined plane will force the glass frame to compress the packing. The screw-thread is so cut that it operates to cause the flange to force the glass frame to compress the packing at the same time that the inclined plane performs the same office; and the flange must be so arranged in reference to the edge of the frame that a part of the flange shall be capable of projecting over the glass frame or a projection therefrom.

The operation is as follows: When the glass frame is shut and clamped so as to compress the packing, the flange projects over that frame and holds it in place. When the flange is turned, the flange relaxes its pressure on the glass frame, and the flange finally turns so far as not to project over it. The glass frame may then be opened. When the glass is again shut, the turning of the flange in the reverse direction causes it to project over the glass frame, and as it is turned it forces that frame to compress the packing and then holds the frame firmly shut, the joint between it and the stationary frame being water tight.

As before stated, the inclined plane and the screw co-operate to force the glass frame into place and to release it, and it is obvious that the whole duty might be performed either by the one or the other, but the flange must by the act of turning force home or release the light-frame, and must be so shaped and arranged with reference to the light-frame that it shall at times project over the frame and at times permit the frame to be opened.

I intend at times to attach to the flange a pin, M, which strikes against stops M′ M′ attached to the stationary frame. When the flange is so turned that the light is free to open, this pin strikes against one of the stops. This stop is convenient, as it prevents the flange from being turned so far as again to project over the frame, thereby preventing its being opened after it is unclamped.

The flange, shaped, arranged, and operating substantially as described, in combination with the glass frame and the packing, is of my invention, and I intend it to be used in place of a screw secured by a pin in the glass frame and opening and shutting with it and entering a nut on the stationary frame, or in place of a screw working in a nut hinged fast to the stationary frame and capable of being vibrated in and out of an open-ended slot in a lug projecting from the glass frame, these being the two usual releasing and confining contrivances in common use prior to my invention.

I claim as of my own invention—

1. The combination, substantially in the manner described, of a turning flange, arranged, shaped, and operating substantially as specified, with a glass frame and suitable interposed packing, whereby the packing may be compressed and the frame held shut or have liberty to open under a mode of operation substantially as set forth.

2. In combination with a glass frame and a turning flange, substantially such as are described, a pin and a stop, operating substantially as set forth.

3. A stationary frame with projecting lugs, having long mortises therein, in combination with pins projecting from a glass frame, both substantially such as herein set forth, so that the glass frame may be opened and shut, substantially as set forth.

4. In combination with a stationary frame attached to the side or deck of a vessel, a sleeve or ring of lead or other ductile metal soldered or otherwise joined thereto, so that it can be flanged or turned over the edge of the opening through the vessel, thereby making the joint between the stationary frame and the vessel water tight, substantially as described.

In testimony whereof I have hereunto subscribed my name.

ENOCH HIDDEN.

In presence of—
FRAS. LOCKWOOD,
GEORGE B. BURN.